United States Patent [19]
Schuitema et al.

[11] Patent Number: 6,053,486
[45] Date of Patent: Apr. 25, 2000

[54] DAMPING CYLINDER

[75] Inventors: Franklin M. Schuitema, Hopkins; Dennis L. Long, Grand Rapids, both of Mich.

[73] Assignee: Suspa, Incorporated, Grand Rapids, Mich.

[21] Appl. No.: 09/039,983

[22] Filed: Mar. 16, 1998

[51] Int. Cl.$^7$ ................................................. F16F 9/348
[52] U.S. Cl. ................ 267/64.15; 188/280; 188/322.15; 188/322.14; 188/282.5; 188/317; 188/322.22; 188/269
[58] Field of Search ................................. 188/280, 282.5, 188/282.6, 320, 317, 322.15, 322.22, 322.14, 322.13, 298, 314, 313, 281, 282.1, 282.8, 282.9, 283, 134, 269, 67, 300, 322.18; 267/64.15, 120, 124–129, 64.12; 248/600

[56] References Cited

U.S. PATENT DOCUMENTS

| | | | |
|---|---|---|---|
| 1,282,712 | 10/1918 | Barrell | 188/280 |
| 1,508,391 | 9/1924 | Greenwood | 188/322.14 |
| 2,252,772 | 8/1941 | Katcher | 188/280 |
| 2,546,038 | 3/1951 | McIntyre et al. | 188/280 |
| 2,579,058 | 12/1951 | Trimble et al. | 188/280 |
| 2,655,233 | 10/1953 | Funkhouser et al. | 188/280 |
| 2,697,496 | 12/1954 | McIntyre | 188/280 |
| 3,074,515 | 1/1963 | MacLellan | 188/280 |
| 3,078,965 | 2/1963 | DeCarbon et al. | 188/322.15 |
| 3,180,453 | 4/1965 | Murata | 188/280 |
| 3,519,109 | 7/1970 | Whisler, Jr. | 188/282.6 |
| 3,706,362 | 12/1972 | Faure | 188/322.14 |
| 3,762,514 | 10/1973 | Freitag | 188/280 |
| 3,799,299 | 3/1974 | Cohen | 188/282.5 |
| 4,045,008 | 8/1977 | Bauer . | |
| 4,156,523 | 5/1979 | Bauer . | |
| 4,183,689 | 1/1980 | Wirges et al. . | |
| 4,383,595 | 5/1983 | Schnitzius . | |
| 4,423,800 | 1/1984 | Kobiske et al. . | |
| 4,474,271 | 10/1984 | Mölders et al. | 188/280 |
| 4,503,951 | 3/1985 | Imaizumi | 267/64.15 |
| 4,624,347 | 11/1986 | Mourray | 188/280 |
| 4,749,068 | 6/1988 | Sirven | 188/322.15 |
| 4,795,009 | 1/1989 | Tanahashi et al. | 188/322.22 |
| 4,809,828 | 3/1989 | Nakazato | 188/282.6 |
| 4,872,537 | 10/1989 | Warner | 188/280 |
| 4,961,482 | 10/1990 | Pohlenz et al. | 188/280 |
| 5,042,625 | 8/1991 | Maus . | |
| 5,072,812 | 12/1991 | Imaizumi . | |
| 5,085,300 | 2/1992 | Kato et al. | 188/282.6 |
| 5,103,754 | 4/1992 | Fujitsubo . | |
| 5,123,506 | 6/1992 | Sirven | 188/280 |
| 5,215,291 | 6/1993 | Bauer et al. . | |
| 5,398,786 | 3/1995 | Mintgen | 188/282.5 |
| 5,529,154 | 6/1996 | Tanaka | 188/280 |
| 5,560,456 | 10/1996 | Koch et al. . | |
| 5,579,874 | 12/1996 | Jeffries et al. | 188/322.15 |
| 5,595,269 | 1/1997 | Beck . | |
| 5,615,867 | 4/1997 | Bauer . | |
| 5,702,091 | 12/1997 | Perrin et al. | 188/300 |

FOREIGN PATENT DOCUMENTS

| | | | |
|---|---|---|---|
| 1202475 | 1/1960 | France | 188/282.6 |
| 1571320 | 6/1969 | France | 188/322.13 |
| 2800630 | 7/1979 | Germany | 188/280 |
| 4238728 | 5/1996 | Germany | 188/280 |
| 53115443 | 10/1978 | Japan | 188/282.5 |
| 1414810 | 11/1975 | United Kingdom | 267/64.15 |
| 9212359 | 7/1992 | WIPO | 188/280 |

*Primary Examiner*—Douglas C. Butler
*Attorney, Agent, or Firm*—Ian C. McLeod

[57] ABSTRACT

A damping cylinder having a staged rate of movement. The cylinder includes a tube, a rod extending from the tube, and a piston carried by the rod within the tube. A liquid at least partially fills the cylinder, and the piston travels within the liquid. A port through the piston permits the liquid to flow through the piston as the piston moves within the cylinder. The piston also carries a normally open flapper valve over the port. If the flow rate of the liquid through the piston is below a preselected maximum rate, the flapper valve remains open. If the flow rate of the liquid exceeds the preselected maximum rate, the flapper valve closes over the port to prohibit flow beyond the maximum rate. In preferred embodiments, a pair of flapper valves is included to limit the rate in both directions, and a bleeder bypass port is included to permit reduced rate movement of the piston after either or both of the flapper valves close.

6 Claims, 3 Drawing Sheets

DAMPING CYLINDER

BACKGROUND OF THE INVENTION

The present invention relates to damping cylinders and gas springs.

Damping cylinders and gas springs are widely used in a variety of applications. Perhaps the most visible application is the counterbalance support of liftgates, trunk lids, and other automotive doors. Other applications include furniture, such as height-adjustable chairs and work surfaces. One such furniture application is illustrated in co-pending application Ser. No. 08/584,266 filed Jan. 11, 1996 by Long.

The construction of such damping cylinders and gas springs are well known. Exemplary constructions are illustrated in U.S. Pat. No. 4,045,008 issued Aug. 30, 1977 to Bauer; U.S. Pat. No. 4,156,523 issued May 29, 1979 to Bauer; U.S. Pat. No. 5,215,291 issued Jun. 1, 1993 to Bauer et al; and U.S. Pat. No. 5,615,867 issued Apr. 1, 1997 to Bauer. Such a cylinder includes a tube at least partially filled with a liquid. A rod having a piston on one end is mounted for reciprocable movement within the cylinder so that the piston travels within the fluid. The piston defines one or more ports through which the fluid passes as the piston moves to provide the damping effect. If the cylinder is a gas spring, a pressurized gas is included within the cylinder to provide an output force or a spring force.

The rate at which the rod is capable of moving with respect to the cylinder depends on a variety of factors, including the size and number of the ports through the piston and the viscosity of the liquid within the tube. Once these parameters are selected and fixed for a particular cylinder, the rate at which the rod moves within the cylinder is largely a function of the axial load on the rod. For fixed loads such as liftgates, the rate will be relatively constant. However, with variable loads, the rate increases with increasing loads. This has made damping cylinders and gas springs undesirable for applications wherein the load on the rod varies significantly. If the rod bears an unusually high load, the assembly supported by the rod may move too quickly for convenient or even safe operation.

SUMMARY OF THE INVENTION

The aforementioned problems are overcome in the present invention wherein a damping cylinder provides a staged rate of rod movement. When the rod speed stays below a preselected maximum, the damping cylinder operates as a conventional cylinder. However, if the rod speed exceeds the preselected maximum, a valve mechanism on the piston reduces the rod speed so that is does not exceed the preselected rate.

More specifically, the damping cylinder includes a normally open limit valve. The limit valve remains open so long as the rate of travel of the piston stays below a preselected maximum. The valve closes the port if the rate of travel exceeds the maximum. When the port is closed, fluid can no longer pass through the port; and the piston speed is reduced, possibly to zero, to prevent the rod from exceeding the preselected rate.

In preferred embodiments of the invention, the valve carried by the piston is a flapper valve; and a bypass port is included within the piston. The limit valve does not cover the bypass port, even in the valve's closed position, so that the piston can continue to move at a reduced rate after the flapper valve closes.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
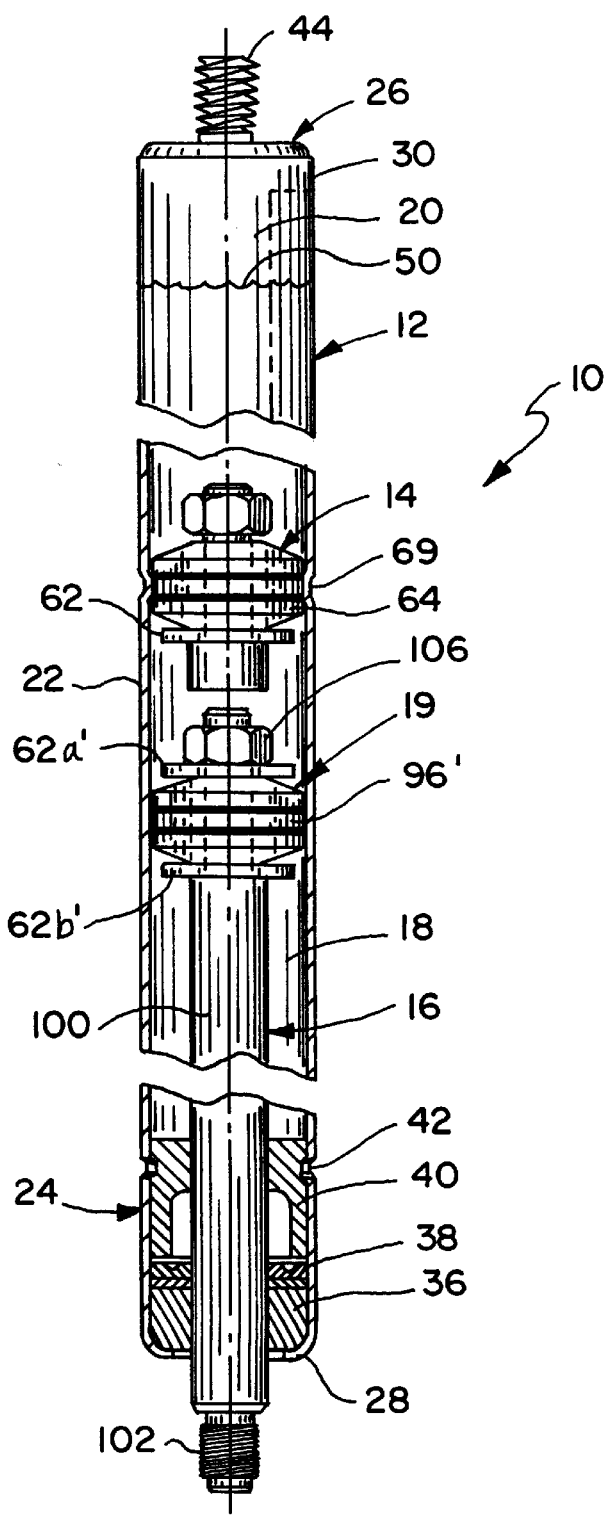
FIG. 1 is a sectional view of the damping cylinder showing all limit valves in their normally open position.
Figure 2:
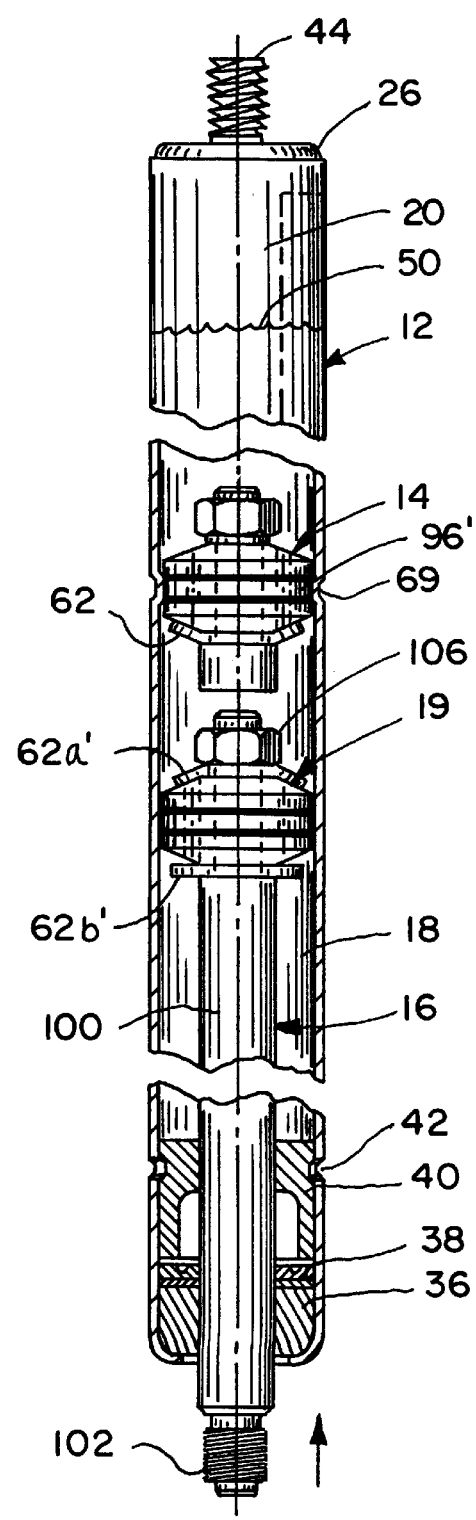
FIG. 2 is a sectional view similar to FIG. 1, but showing two of the limit valves closed as happens when the rod is traveling into the tube at an excessive rate.
Figure 3:
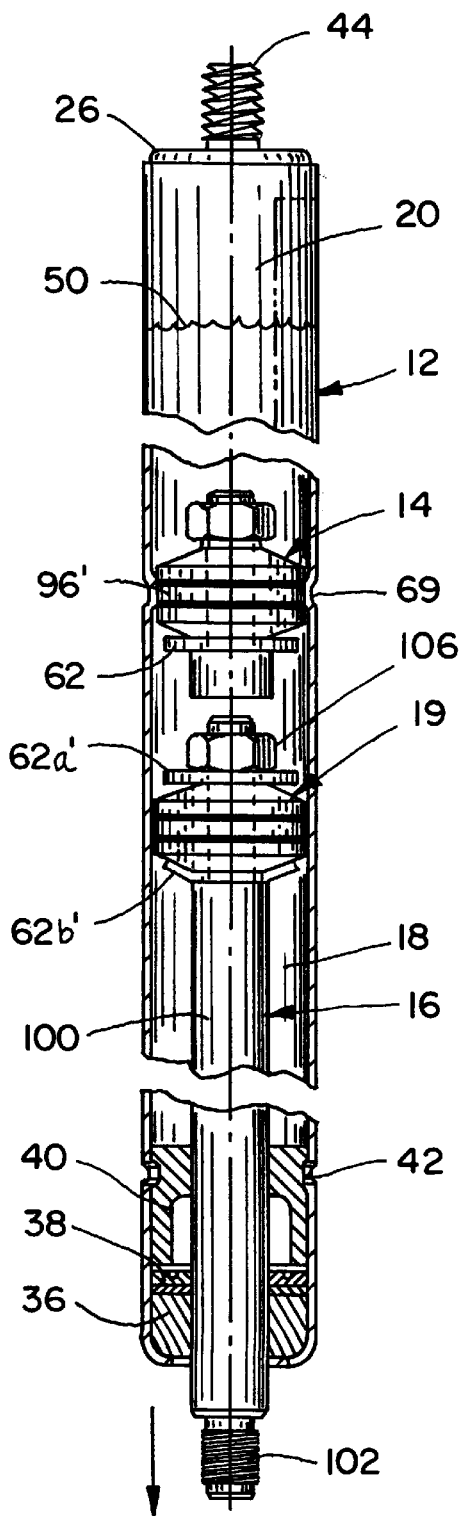
FIG. 3 is a sectional view similar to FIG. 1, but showing one limit valve closed as happens when the rod is traveling out of the tube at an excessive rate.

A damping cylinder constructed in accordance with a preferred embodiment of the invention is illustrated in FIGS. 1–3 and generally designated 10. The damping cylinder includes a tube assembly 12, a base valve assembly 14, a rod assembly 16, and a fluid or oil 18. The base valve assembly 14 is fixed within the tube assembly 12. The rod assembly 16 is mounted for reciprocable movement within the tube assembly 12 below the base valve assembly 14. The fluid 18 fills the cylinder to a point above the base valve assembly 14. If the cylinder is a gas spring, a pressurized gas 20 is located in the head space above the fluid 18. Both the base valve assembly 14 and the rod assembly 16 include ports and limit valves as will be described to prevent the rod assembly 16 from moving at a rate faster than a preselected maximum rate.

With the exception of the rod assembly 16, the construction of the damping cylinder is generally well known to those skilled in the art. Accordingly, the components other than the rod assembly 16 will be only briefly described; and this specification will focus on the rod assembly 16 and its operation in conjunction with the base valve assembly 14.

Turning first to the tube assembly 12, this assembly includes a tube 22, a lower seal assembly 24, and an upper end cap 26. The tube 22 is a seam-welded, drawn-over-mandril precision tube. The tube is generally uniform in diameter throughout its length and includes a slightly turned in bottom 28 and a top 30. The seal assembly 24 within the bottom of the tube 22 includes a guide 36, a seal 38, and a spacer 40, all of conventional construction and conventional assembly. The tube 22 is pinched or swedged at location 42 to retain the seal assembly 24 in position against the tube bottom 28. The end cap 26 is welded to the top 30 of the tube 22 to provide a gas-tight seal. A threaded stub 44 is integral with the end cap 26 to provide a means of attaching the tube assembly 12 to an article (not shown).

A fluid or oil 18 fills the tube above the seal assembly 24 to a position 50 above the base valve assembly 14. Preferably, the fluid is Rykon MV oil sold by Amoco Oil Company of Chicago, Ill. Other appropriate fluids may be selected depending upon the particular application. Appropriate fluids are known to those skilled in the art.

If the cylinder is to be a gas spring, a pressurized gas 20 fills the tube assembly 12 above the fluid 18. In the preferred embodiment, the gas is nitrogen at a pressure in the range of 100 to 2500 pounds per square inch (psi). The pressurized gas provides an output force to urges the rod assembly 16 to extend from the tube assembly 12 to bias these components away from one another. The particular pressure will depend on the desired performance of the cylinder 10.

Figure 8:
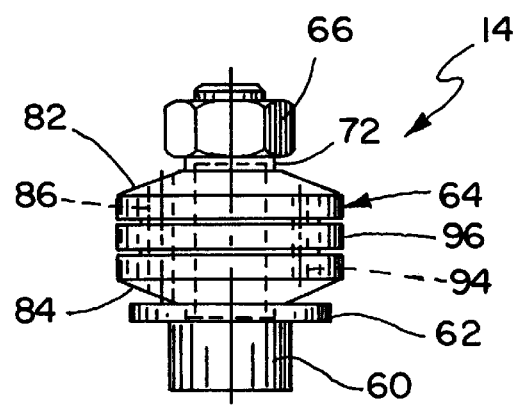
FIG. 8 is an elevational view of the base valve assembly.

The base valve assembly 14 is best illustrated in FIG. 8. The assembly 14 includes a bolt 60, a valve plate 62, a piston 64, and a nut 66. The bolt 60 is an M5×20 SHCS bolt, and the nut 66 is an M5 nut with nylon thread locker. The piston 64 and the valve plate 62 are secured on the bolt 60 by the nut 66. It is possible to substitute a rivet construction for the bolt and the nut. The tube 22 is pinched or swedged at location 69 to retain the base valve assembly in fixed position. An O-ring 96 provides a fluid-tight seal between the tube 22 and the base valve assembly 14.

Figure 4:
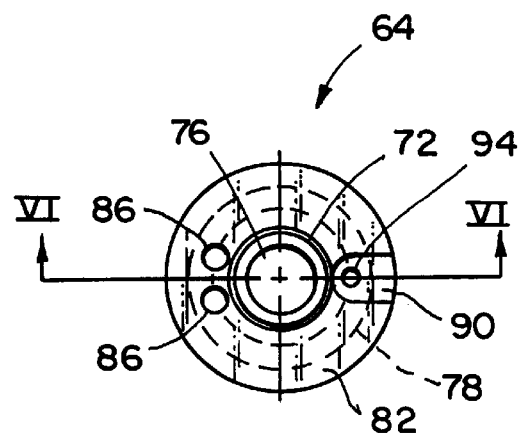
FIG. 4 is a top plan view of the piston.
Figure 5:
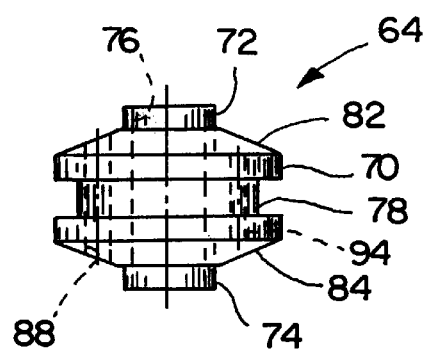
FIG. 5 is an elevational view of the piston.
Figure 6:
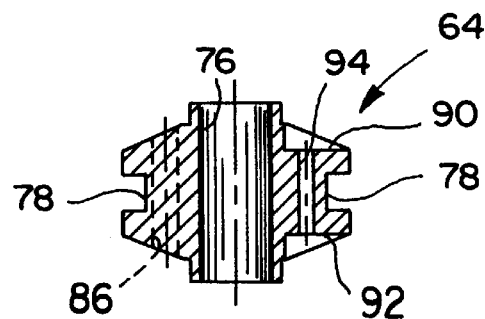
FIG. 6 is a sectional view of the piston taken along line VI—VI in FIG. 4.

The piston 64 (see particularly FIGS. 4–6) is common to both the base valve assembly 14 and the piston assembly 19. The piston is a single piece including a body 70 and a pair of opposed extensions 72 and 74. The piston 64 defines a central bore 76 for receiving the rod. The piston body 70 defines an outwardly facing circumferential groove 78 within which is seated an O-ring 96. The body 70 also defines upper and lower valve seat surfaces 82 and 84. Both seats 82 and 84 extend at an acute angle to the axis of the piston 64. In the preferred embodiment, the angle is 22.5 degrees.

The piston 64 defines a pair of ports 86 extending through the piston 64 between the valve seats 82 and 84. The ports 86 are parallel to the axis of the piston 64, and the diameter of each port is 1.75 millimeter (mm). The number, size, and shape of the ports will depend on the particular application and performance requirements.

A pair of longitudinally aligned recesses 90 and 92 extend into the valve body 70 through the valve surfaces 82 and 84. A bypass port 94 extends through the valve body 64 between the recesses 90 and 92. The diameter of the bypass port 94 is 0.5 mm. Again, the number, size, and shape of the bypass port(s) will be selected depending on performance requirements.

The valve plate 62 is a disc-shaped member secured between the head of bolt 60 and the piston 64. The disc is 14 mm in diameter, 1.6 mm thick, and fabricated of an 80 durometer elastomer. An appropriate elastomer is a urethane material sold by Zatkoff Seals and Packings of Grand Rapids, Mich. Other suitable materials of different dimensions and/or durometers can be used depending on the application and the performance requirements.

Figure 7:
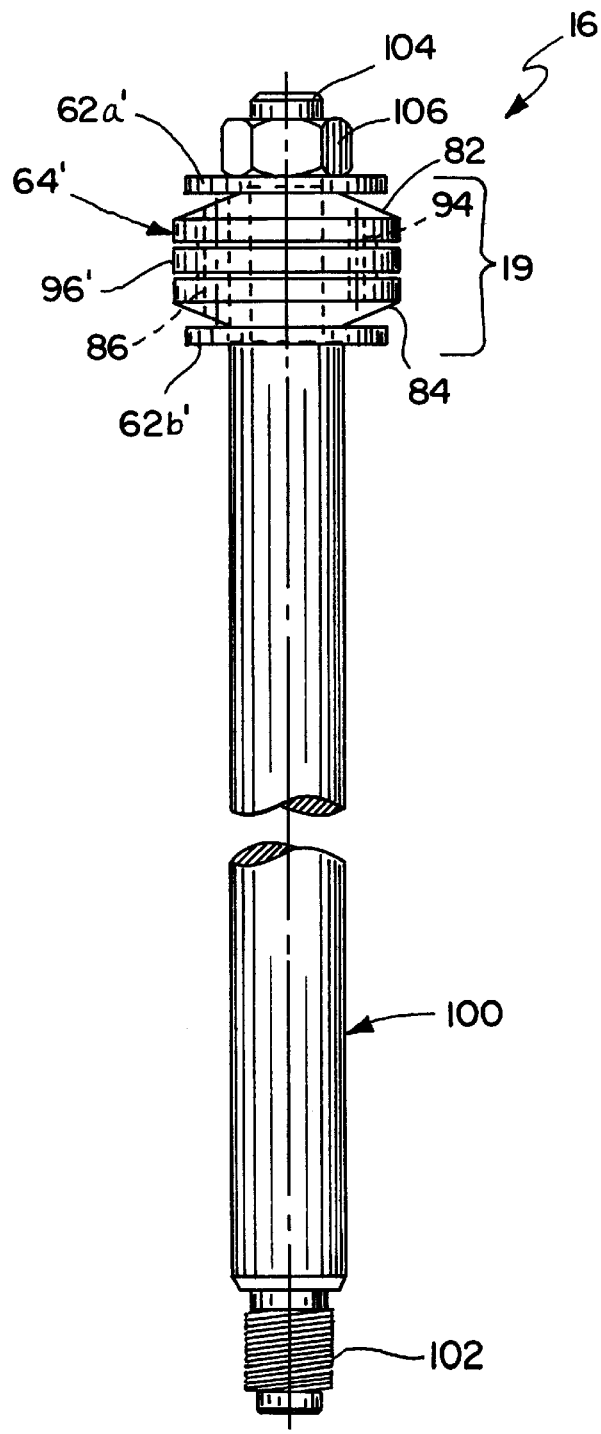
FIG. 7 is an elevational view of the piston assembly.

The rod assembly 16 is best illustrated in FIG. 7. The assembly includes a rod 100 and a piston assembly 19 fixedly mounted on the rod. The rod 100 is a single piece including a lower threaded stub 102 and an upper threaded stub 104. The lower stub 102 is used to secure the rod 100 to an article (not shown). The upper stub 104 carries a nut 106 to secure the piston assembly 19 in position. The nut 106 is a M5 nut with nylon thread locker. As with the base valve 14, a rivet construction can be substituted for the thread and the nut.

The piston assembly 19 includes a piston 64', an O-ring 96', and a pair of valve plates 62a' and 62b'. The piston 64' and the O-ring 96' are identical to the previously described piston 64 and O-ring 96. Accordingly, their construction will not be restated.

The valve plates 62a' and 62b' also are identical to the previously described valve plate 62. Accordingly, their description will not be restated. Both valve plates 62a' and 62b' are shown in FIG. 1 in their static, normally open position, which leaves ports 86 open.

Assembly and Operation

The components and assembly of the cylinder 10, with the exception of the piston assembly 19, are generally well known to those skilled in the art. The tube 22 is fabricated as a seam-welded, drawn-over-mandrel piece. The remaining metallic parts are fabricated by machining, and the polymeric and elastomeric parts are fabricated by molding. Other manufacturing techniques may be used depending on part volumes and tolerances. The piston assembly 19 is sandwiched as illustrated in FIG. 7 on rod 100 and secured in position by the nut 106 or by riveting as appropriate. The remaining assembly steps are well known to those skilled in the art and need not be described in detail.

The static, normally open position of the valve plates 62, 62a', and 62b' are illustrated in FIGS. 1 and 7–8. In this position, the fluid flows freely through ports 86 in the pistons 64 and 64' so that the damping cylinder 10 operates in conventional fashion. The oil 18 within the cylinder 10 flows through the ports 86 and 94 as the piston assembly 19 moves within the tube 22. This restricted flow provides the damping action. As the piston moves upwardly (as oriented in FIG. 1), oil 18 must also flow upwardly through base valve 14 as the rod 100 displaces oil. Similarly, the oil 18 must flow downwardly through the base valve assembly 14 as the rod assembly 16 is withdrawn from the cylinder.

The valve plates 62, 62a', and 62b' are all designed to deflect at a preselected or predetermined maximum travel rate. In the disclosed embodiment, the maximum travel rate is approximately 4 inches per second (ips). Below that maximum rate, the valve plates do not deflect substantially.

FIG. 2 illustrates the deflection of the valve plates 62 and 62a' when the rod assembly 16 is traveling into the tube 22 at a rate in excess of the maximum rate. At the excessive rate, the valve plates 62 and 62a' deflect under the resistance of the fluid against their respective valve seats 84 and 82 to close the ports 86 and prevent further fluid flow through those ports. Accordingly, speed or rate of the rod assembly 16 within the tube 22 is significantly reduced to prevent the rod assembly 16 from traveling in excess of the maximum rate. However, even with the valve plates in their closed position as illustrated in FIG. 2, fluid still flows through the bypass ports 94 in the base valve assembly 14 and the piston assembly 19 because the recesses 92 and 94 are not sealed by the limit valves. Consequently, the rod assembly 16 will still move, but at a greatly reduced rate from the maximum rate. The valve plates will not resume their normal open position until the force that created the excessive rate is relieved.

FIG. 3 illustrates the deflection of the valve plate 62b' when the rod assembly 16 is withdrawn from the tube assembly 12 at a rate in excess of the maximum rate. When the maximum rate is exceeded, the valve plate 62b' is deflected against the valve seat 84 to close the ports 86. This action significantly reduces the speed of the rod assembly 16 within the tube assembly 12. As before, fluid may still flow through the bypass valve 94 in the piston assembly 19 through the recess 92.

The damping cylinder can have different maximum rates in the two opposite directions by altering the performance characteristics of the valve plates. This may be accomplished, for example, by changing the shape, thickness, and/or durometer of selected valve plate(s).

The described damping cylinder has a "staged rate" of rod movement—a first range of rates when the valve plates are open and a second range of rates when the valve plates are closed. The rate is "normal," providing little or minimal resistance, when the rod assembly 16 moves at a rate below the maximum rate. However, the speed of the rod assembly 16 is reduced and the rod assembly moves at a reduced rate permitted by the bleeder ports 94 when the preselected maximum rate is exceeded. If bleeder ports are not provided, the rod will stop or "lock up" when the valves close.

The present damping cylinder provides operational and safety advantages over known cylinders. Specifically, by providing the staged-rate operation, two components interconnected by the cylinder are prevented from moving relative one another at a rate in excess of the preselected rate. This is helpful, for example, in a situation where the damping cylinder is used in a height-adjustable desk. If the desk is excessively loaded (i.e. with material on the desk top) at the time of adjustment, the damping cylinder 10 prevents the desk top from dropping suddenly. Other appropriate applications where rate is to be limited are many and varied.

Finally, the invention has been described in conjunction with a particular valve assembly. However, the invention is not limited to the disclosed valve construction and indeed extends to all valve constructions capable of providing the staged rate of movement. Suitable valves will be recognized by those skilled in the art.

The above description is that of a preferred embodiment of the invention. Various alterations and changes can be made without departing from the spirit and broader aspects of the invention as defined in the appended claims, which are to be interpreted in accordance with the principals of patent law, including the Doctrine of Equivalents.

The embodiments of the invention in which an exclusive property or privilege is claimed are defined as follows:

1. A damper cylinder for reducing a rate of movement of two spaced apart objects, connected at opposed ends of the cylinder, away from or toward each other with the cylinder in a vertical orientation, which comprises:
   (a) a housing having a first end and a second end with at least one side wall therebetween forming a chamber containing a liquid and a gas in the first end of the housing which is uppermost, the second end having an opening and the first end connected to one of the objects;
   (b) a rod member having a first end and a second end and slidably and sealably mounted through the opening in the second end of the housing such that the first end of the rod member extends into the housing and the second end of the rod member is connected to a second of the objects;
   (c) a piston member slidably and sealably positioned on the side wall in the chamber of the housing and having opposed ends mounted on the first end of the rod member, the piston member having at least two orifices extending parallel to the rod member through the piston member;
   (d) two first elastomeric disc seals, smaller in diameter than the piston member, each mounted on one of the opposed ends of the piston member, wherein when a rate of movement of the rod member and piston member in the housing exceeds a predetermined rate, a force of the fluid in the housing on the seal causes one of the first seals to move such as to close at least one orifice of the at least two orifices in the piston member to reduce the rate of movement of the rod member and the piston member;
   (e) a valve means spaced from the piston member at a limit of travel of the piston member, the valve member having at least two orifices extending parallel to the rod member through the valve means; and
   (f) a second elastomeric disc seal mounted on the valve means facing the piston means and smaller in diameter than the valve means, wherein as the piston member is moved towards the valve means at a predetermined rate, the second disc means closes at least one of the at least two orifices in the valve means and wherein the orifices remaining open when the piston member and rod member are moved away from the valve means.

2. The damper cylinder of claim 1 wherein the orifices have different diameters.

3. The damper cylinder of claim 1 wherein a sealing means is mounted on the piston member between the ends and wherein an outer diameter of the sealing means is equal to an inner diameter of the housing, such as to create a seal between the piston member and the housing.

4. A damper cylinder for reducing a rate of movement of two spaced apart objects connected at opposed ends of the cylinder, away from or toward each other with the cylinder in a vertical orientation, which comprises:
   (a) a housing having a first end and a second end with at least one side wall therebetween forming a chamber containing a liquid and a gas in the first end of the housing which is uppermost, the second end having an opening and the first end connected to one of the objects;
   (b) a rod member having a first end and a second end and slidably and sealably mounted through the opening in the second end of the housing such that the first end of the rod member extends into the housing and the second end of the rod member is adapted to connect to a second of the objects;
   (c) a piston member slidably and sealably positioned on the side wall in the chamber of the housing and having opposed ends, mounted on the first end of the rod member, the piston member having at least two orifices extending parallel to the rod member;
   (d) a pair of first elastomeric disc seals mounted on each of the ends of the piston member, adjacent the orifices, such that when a rate of movement of the rod member and piston member in the housing exceeds a predetermined rate, a force of the fluid in the housing on one of the disc seals causes the disc seals to move such as to close at least one orifice of the at least two orifices in the piston member to reduce the rate of movement of the rod member and the piston member;
   (e) a valve means spaced from the piston member at a limit of travel of the piston member, the valve member having at least two orifices extending parallel to the rod member through the valve means; and
   (f) a second elastomeric disc seal mounted on the valve means facing the piston means, wherein as the piston member is moved towards the valve means at a predetermined rate, the second disc means closes at least one of the at least two orifices in the valve means and wherein the orifices remain open when the piston member is withdrawn away from the valve means.

5. The damper cylinder of claim 4 herein air is the gas provided in the first end of the cylinder along with hydraulic oil as the liquid.

6. The damper cylinder of claim 4 wherein the valve means provides a continuous column of hydraulic oil as the liquid between the valve means and the piston member when the second disc seal on the valve means closes and air is the gas.

* * * * *